United States Patent
Warren et al.

(10) Patent No.: US 10,317,315 B2
(45) Date of Patent: Jun. 11, 2019

(54) PROBE RETENTION-SEALING FEATURE

(71) Applicant: United Technologies Corporation, Farmington, CT (US)

(72) Inventors: Eli Cole Warren, Wethersfield, CT (US); Nicholas R. Leslie, South Berwick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 222 days.

(21) Appl. No.: 15/412,572

(22) Filed: Jan. 23, 2017

(65) Prior Publication Data

US 2017/0122840 A1 May 4, 2017

Related U.S. Application Data

(63) Continuation of application No. 14/107,771, filed on Dec. 16, 2013, now Pat. No. 9,551,632.

(60) Provisional application No. 61/816,026, filed on Apr. 25, 2013, provisional application No. 61/791,020, filed on Mar. 15, 2013.

(51) Int. Cl.
| | |
|---|---|
| *G01M 15/14* | (2006.01) |
| *F01D 11/20* | (2006.01) |
| *F01D 17/02* | (2006.01) |
| *F01D 25/28* | (2006.01) |
| *F01D 21/00* | (2006.01) |
| *F01D 25/24* | (2006.01) |

(52) U.S. Cl.
CPC ............. *G01M 15/14* (2013.01); *F01D 11/20* (2013.01); *F01D 17/02* (2013.01); *F01D 21/003* (2013.01); *F01D 25/24* (2013.01); *F01D 25/285* (2013.01); *F05D 2220/32* (2013.01); *Y10T 29/4932* (2015.01); *Y10T 403/3993* (2015.01)

(58) Field of Classification Search
CPC ...... G01M 15/14; F01D 21/003; F01D 25/24; F01D 25/285; F05D 2220/32
USPC ......... 73/866.5, 112.01–112.06; 324/207.25, 324/166–175; 29/595, 888.02, 29/889–889.5, 890.01, 890.09, 428–431, 29/505, 515–517, 525, 525.01, 525.05
See application file for complete search history.

(56) References Cited

U.S. PATENT DOCUMENTS

| | | | |
|---|---|---|---|
| 4,817,417 A * | 4/1989 | Twerdochlib | F01D 21/003 269/71 |
| 6,490,868 B1 * | 12/2002 | Bunce | F01D 21/003 248/288.31 |
| 7,153,023 B2 | 12/2006 | Howard et al. | |
| 7,455,495 B2 | 11/2008 | Leogrande et al. | |
| 2014/0076037 A1 | 3/2014 | Warren et al. | |
| 2014/0366613 A1 | 12/2014 | Warren et al. | |

* cited by examiner

*Primary Examiner* — Robert R Raevis
(74) *Attorney, Agent, or Firm* — Cantor Colburn LLP (57) ABSTRACT

A probe assembly for a gas turbine engine is disclosed. The probe assembly may include a probe, and a fastener to retain the probe within a case of the gas turbine engine, the fastener including a sealing arrangement with a heat shield of the gas turbine engine.

7 Claims, 7 Drawing Sheets

PROBE RETENTION-SEALING FEATURE

CROSS REFERENCE TO RELATED APPLICATIONS

This application is a divisional application of U.S. patent application Ser. No. 14/107,771 filed on Dec. 16, 2013, which claims the benefit of U.S. Provisional Patent Application No. 61/791,020 filed on Mar. 15, 2013 and U.S. Provisional Patent Application No. 61/816,026 filed on Apr. 25, 2013, the entire contents of each of these applications are incorporated herein by reference thereto.

FIELD OF THE DISCLOSURE

The present disclosure is directed generally toward gas turbine engines, and more specifically toward capacitance-based clearance probes in gas turbine engines.

BACKGROUND OF THE DISCLOSURE

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

The compressor and turbine sections include multiple rotors and stators configured to enable optimal operation. Gas turbine engines maintain an optimal clearance (distance) between the tips of the rotors and an outside diameter of a gas path within the turbine engine, and thereby provide the conditions necessary to achieve a desired performance.

The gas turbine engine performance is validated, in part, by measuring the blade tip clearance. In order to measure the tip clearance, one or more tip clearance probes are installed in the outer air seal wall of the turbine engine. As the tip clearance probes are incorporated onto the outer air seal of the gas turbine after the outer air seal has been manufactured, it is necessary to operate the outer air seal casing to accommodate the tip clearance probe. The operations to the engine hardware for installation of the tip clearance probe typically involve gaps in the heat shields which cause leak paths, thereby changing the heat transfer and thermal expansion of the inner cases.

Accordingly, there exists a need for a reliable method to seal the gaps between the probes and the heat shields. This invention is directed to solving this need and others.

SUMMARY OF THE DISCLOSURE

According to one exemplary embodiment of the present disclosure, a probe assembly for a gas turbine engine is disclosed. The probe assembly may comprise a probe, and a fastener to retain the probe within a case of the gas turbine engine, the fastener including a sealing arrangement with a heat shield of the gas turbine engine.

In another embodiment, the fastener may comprise a C-clip, and the probe and the fastener may be shaped to fill gaps between the case and the heat shield.

In another embodiment, the fastener may include a surface configured to engage the heat shield.

In another embodiment, the surface of the fastener may extend in a vertical direction and is in sealing contact with the heat shield.

In another embodiment, the fastener may have a shape similar to a shape of a portion of the case.

In another embodiment, the fastener may be configured to block leak paths and minimize leakage between the heat shield, case and probe.

In another embodiment, the fastener may retain the probe to the case via an interference fit.

In another embodiment, the fastener may be welded to the probe, and the case may be sandwiched between the fastener and a lip of the probe.

In another embodiment, the fastener may include tabs contoured to seal grooves between the case and the heat shield.

In another embodiment, the probe assembly may further comprise potting material to seal gaps between the fastener and the probe.

According to another exemplary embodiment of the present disclosure, a fastener for a probe assembly of a gas turbine engine is disclosed. The fastener may comprise a body configured to retain a probe within a case of the gas turbine engine and to seal leak paths in the case.

In another embodiment, the body may be generally "c"-shaped and may retain the probe to the case via an interference fit.

In another embodiment, the body may include a vertical protrusion designed to engage a heat shield of the case.

In another embodiment, the vertical protrusion may have an inclined surface in sealing contact with a surface of the heat shield.

In another embodiment, the body may have surfaces matching a surface of a heat shield to provide a snap fit arrangement with the heat shield.

According to yet another exemplary embodiment of the present disclosure, a method for installing a probe in a case of a gas turbine engine is disclosed. The method may comprise retaining the probe in the case with a clip, the clip including a sealing feature configured to engage with a heat shield of the case when assembled, and assembling the heat shield to the case, probe, and clip.

In another embodiment, the method may further comprise snap fitting the heat shield onto the case, probe, and clip in a sealing arrangement.

In another embodiment, the method may further comprise sandwiching the case between the clip and a lip of the probe to form a joint.

In another embodiment, the method may further comprise applying an installation fixture to impart a compressive load on the joint.

In another embodiment, the method may further comprise welding the clip to the probe, and removing the installation fixture.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
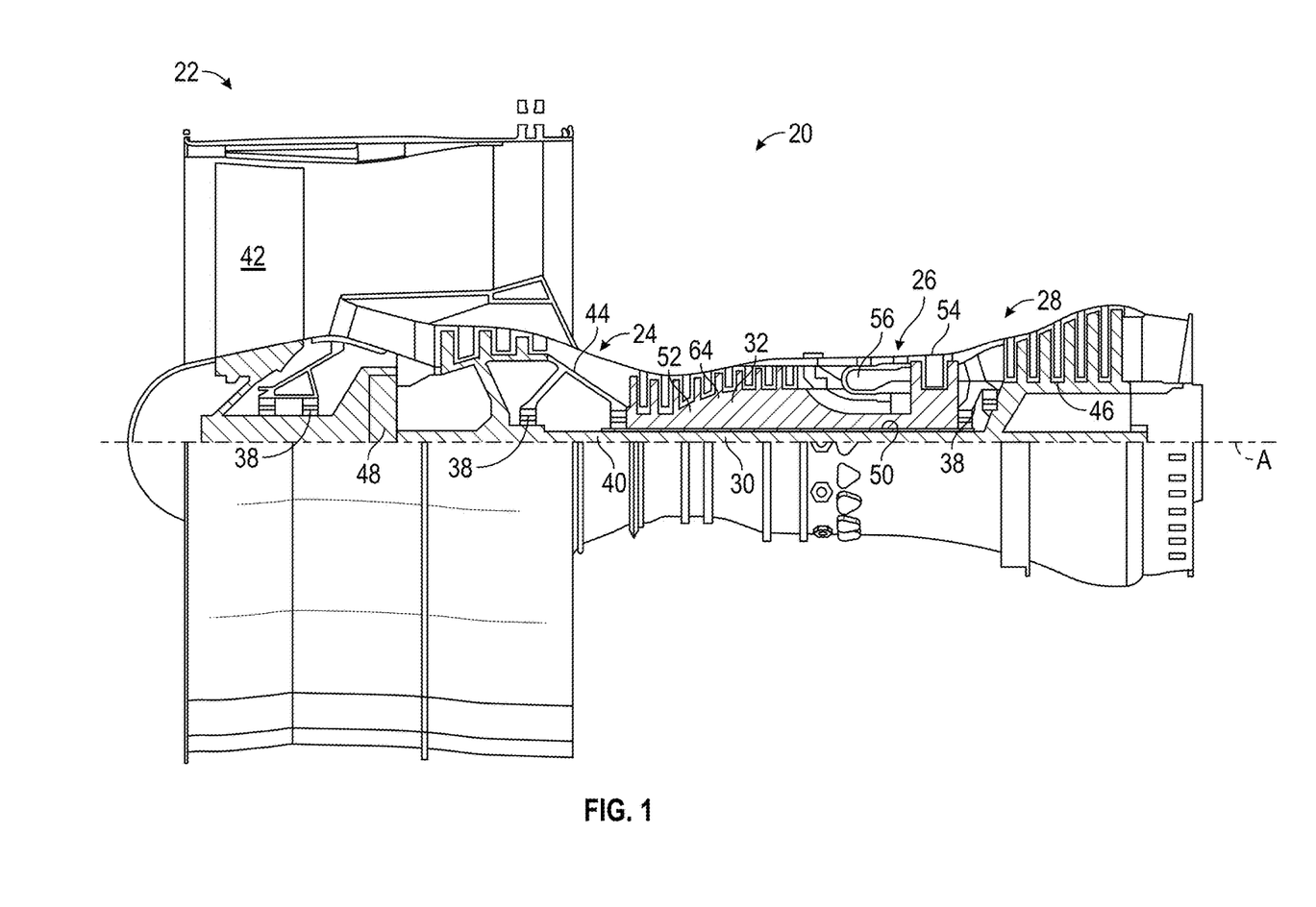
FIG. 1 shows a gas turbine engine, according to one embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a compressor section 24 where air is pressurized, a combustor 26 downstream of the compressor section which mixes and ignites the compressed air with fuel and thereby generates hot combustion gases, a turbine section 28 downstream of the combustor 26 for extracting power from the hot combustion gases, and an annular flow path extending axially through each. The gas turbine engine 20 may be used on an aircraft for generating thrust or power, or in land-based operations for generating power as well.

Referring now to FIGS. 2-9, with continued reference to FIG. 1, an example case 60, such as a case in the compression section 24 or turbine section 28 of the engine 20, is shown. The case 60 circumscribes a blade array 64, which is shown in broken line form for clarity in FIG. 2.

Figure 2:
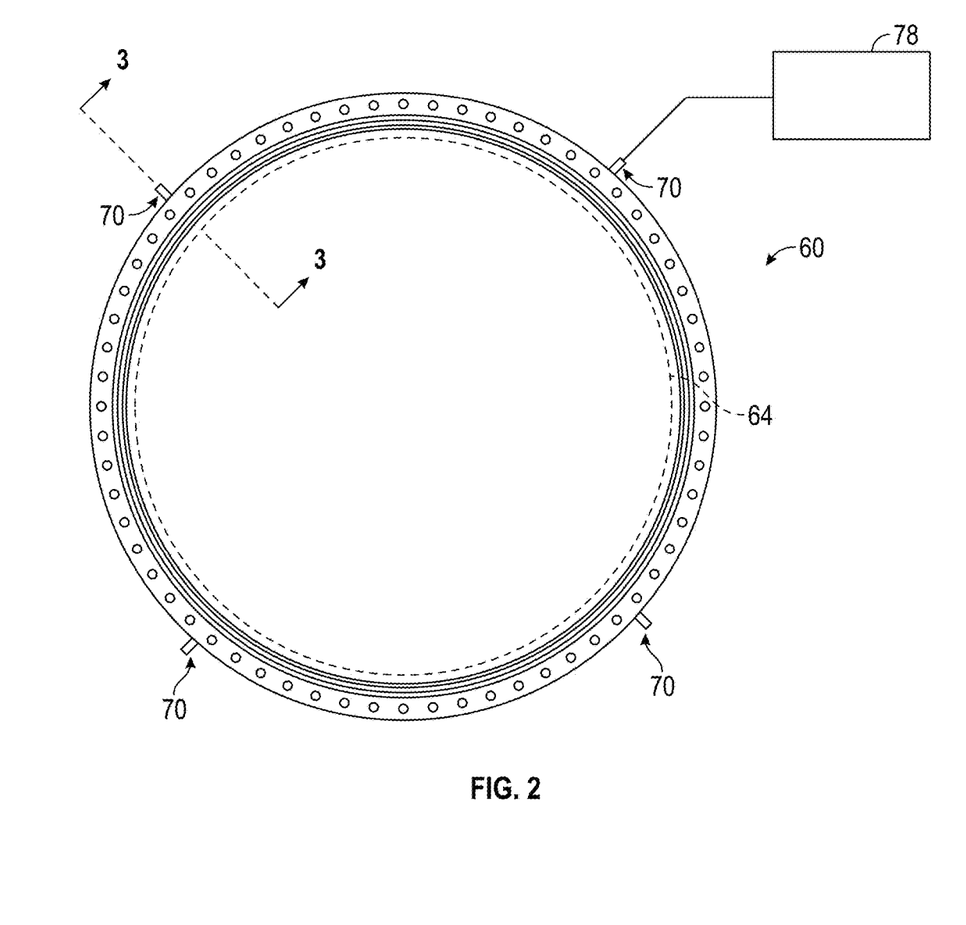
FIG. 2 is an aft view of a case of the gas turbine engine of FIG. 1, according to one embodiment of the present disclosure.

The case 60 may hold one or more probes 70, such as capacitance based clearance probes, within respective apertures 72 of the case 60. For example, the probes 70 may be embedded in the case 60. The probes 70 may include sensors 74, such as capacitance sensors, that monitor a distance D between tips 76 of blades within the array 64 and the sensor 74. The distance D is monitored during operation of the engine 20. Identifying changes in the distance D is useful as is known and may identify areas having unacceptable wear and/or performance. The sensors 74 may be linked to a controller 78 that calculates the distance D based on the measured capacitance.

Figure 3:
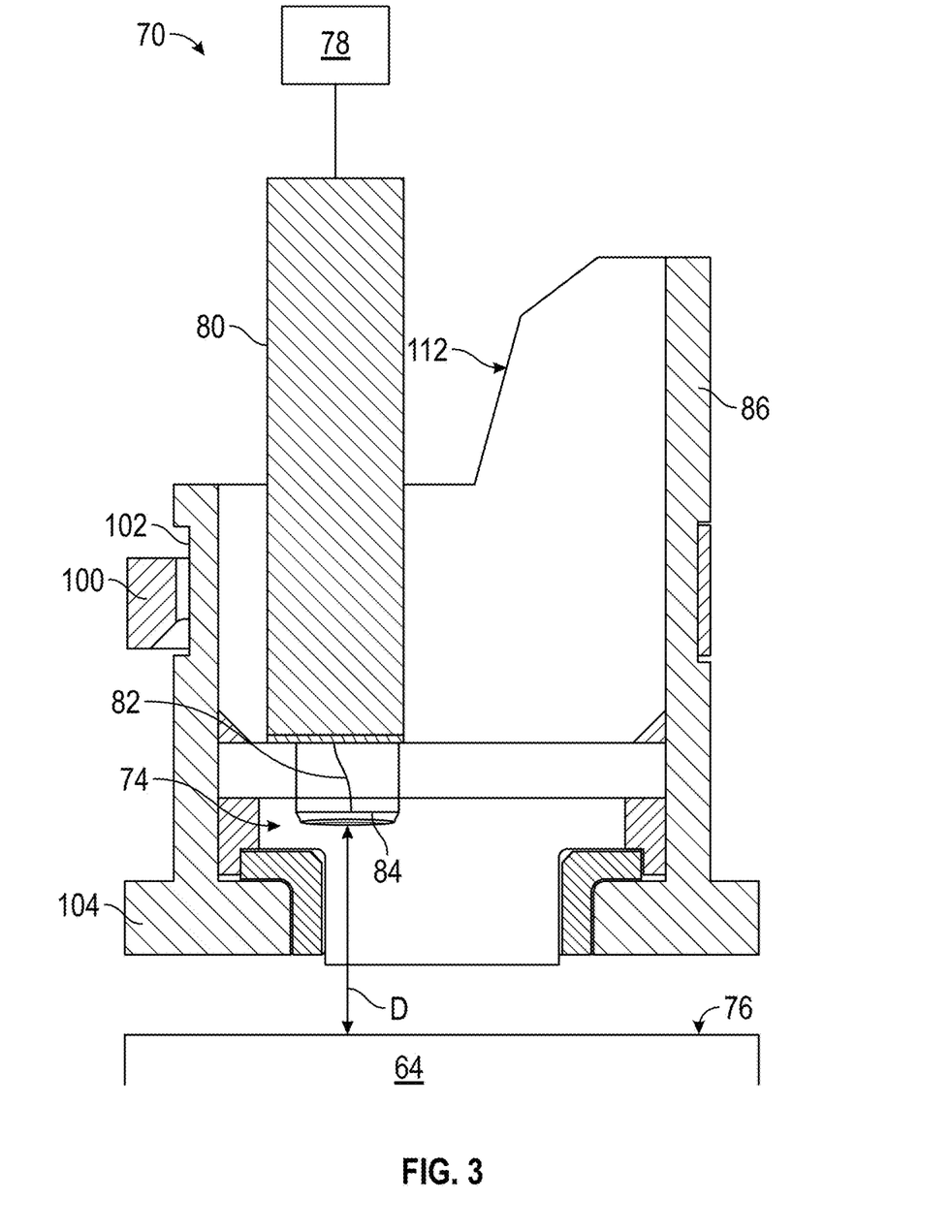
FIG. 3 is a cross-sectional view of a probe for use in the gas turbine engine of FIG. 1, according to one embodiment of the present disclosure.
Figure 4:
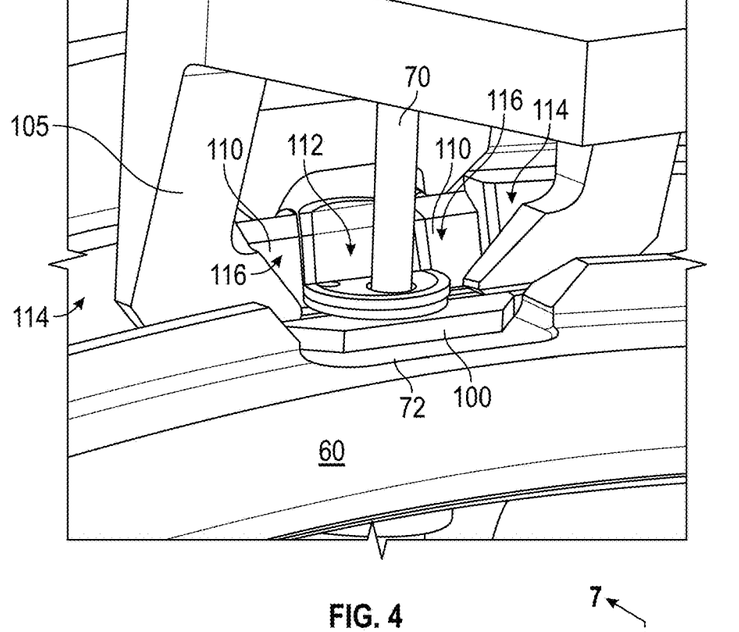
FIG. 4 is a perspective view of the probe of FIG. 3 being installed within the case of FIG. 2, according to one embodiment of the present disclosure.
Figure 5:
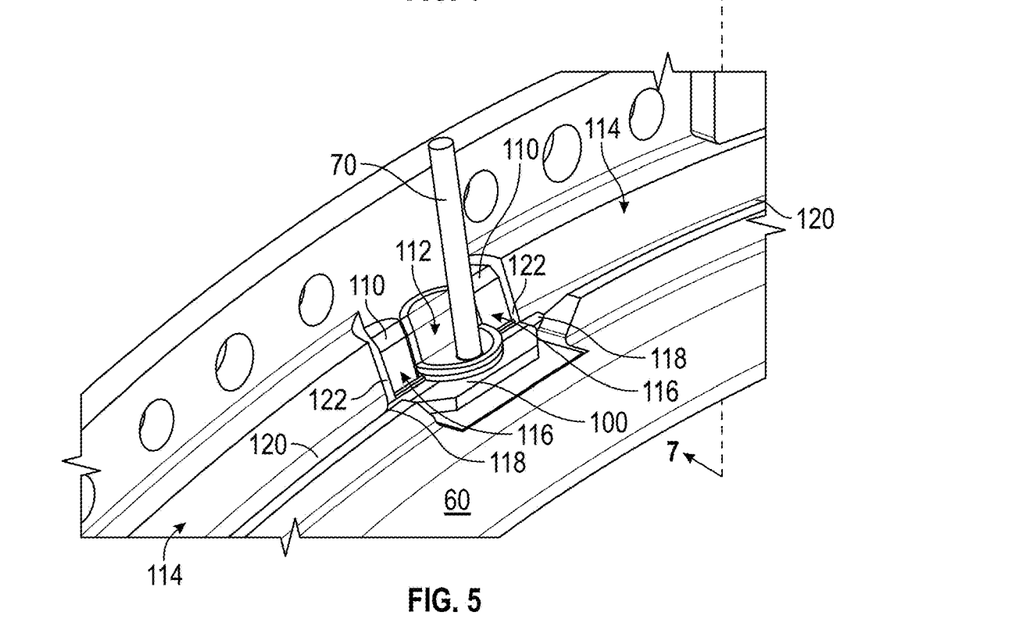
FIG. 5 is a perspective view of the probe of FIG. 4 after installation in the case, according to one embodiment of the present disclosure.
Figure 6:
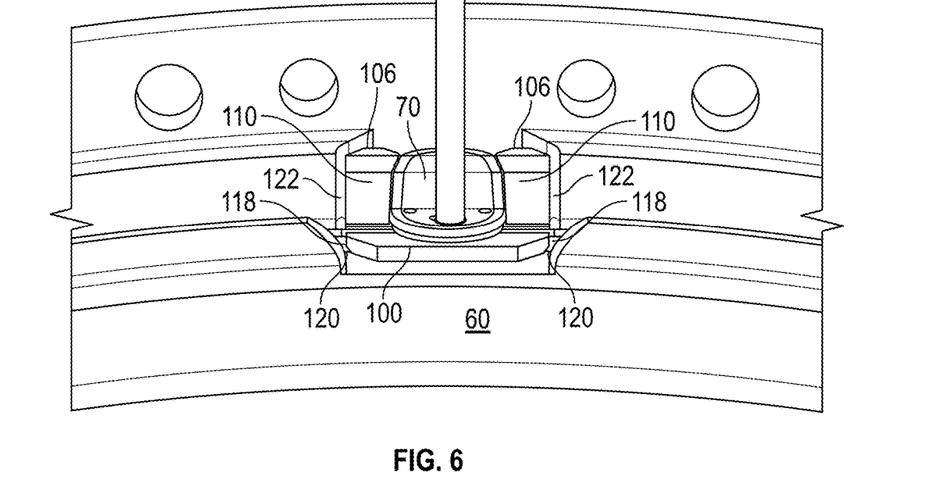
FIG. 6 is a front view of the probe in the case of FIG. 5, according to one embodiment of the present disclosure.
Figure 7:
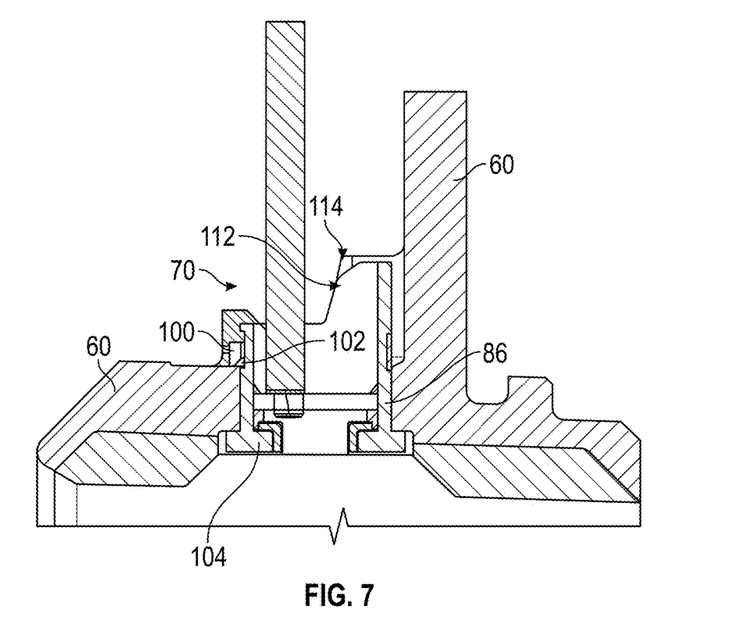
FIG. 7 is a cross-sectional view of the probe in the case FIG. 5 taken along line 7-7 of FIG. 5, according to one embodiment of the present disclosure.

Each of the probes 70 may include an electric lead 80, which may connect the sensor 74 to the controller 78, or to any other system that is operable to receive and act upon sensor measurements, including via wireless communications. In an embodiment, the sensor 74 may comprise a sensor wire 82 extending from the electric lead 80, and a tack strap or sensor face 84 connected to the sensor wire 82. The probe 70 may also include a housing 86, such as a ferrule, to locate the electric lead 80 in place within the case 60. Other components or assemblies for the probe 70 are certainly possible.

A clip or fastener 100 may be used to retain the probe 70 within the case 60. For example, the fastener 100 may have a generally "c"-shaped body, such as a C-clip, circumscribing at least part of the probe 70. The fastener 100 may hold the probe 70 to the case 60 via an interference fit. More specifically, the fastener 100 may be snapped or fit into place within a recess 102 of the housing 86. The case 60 may be sandwiched between the fastener 100 and a lip 104 of the housing 86 of the probe 70, thereby forming a joint, as shown best in FIG. 7. Furthermore, an installation fixture 105 (FIG. 4) may be applied on the fastener 100 to impart a compressive load onto the joint of the fastener 100, case 60 and probe 70. The fastener 100 may then be welded (such as via TIG welding) to the housing 86 of the probe 70, such as within the recess 102 of the housing 86. The installation fixture 105 may then be removed and the probe 70 held within the case 60 by the fastener 100 via an interference fit.

Figure 8:
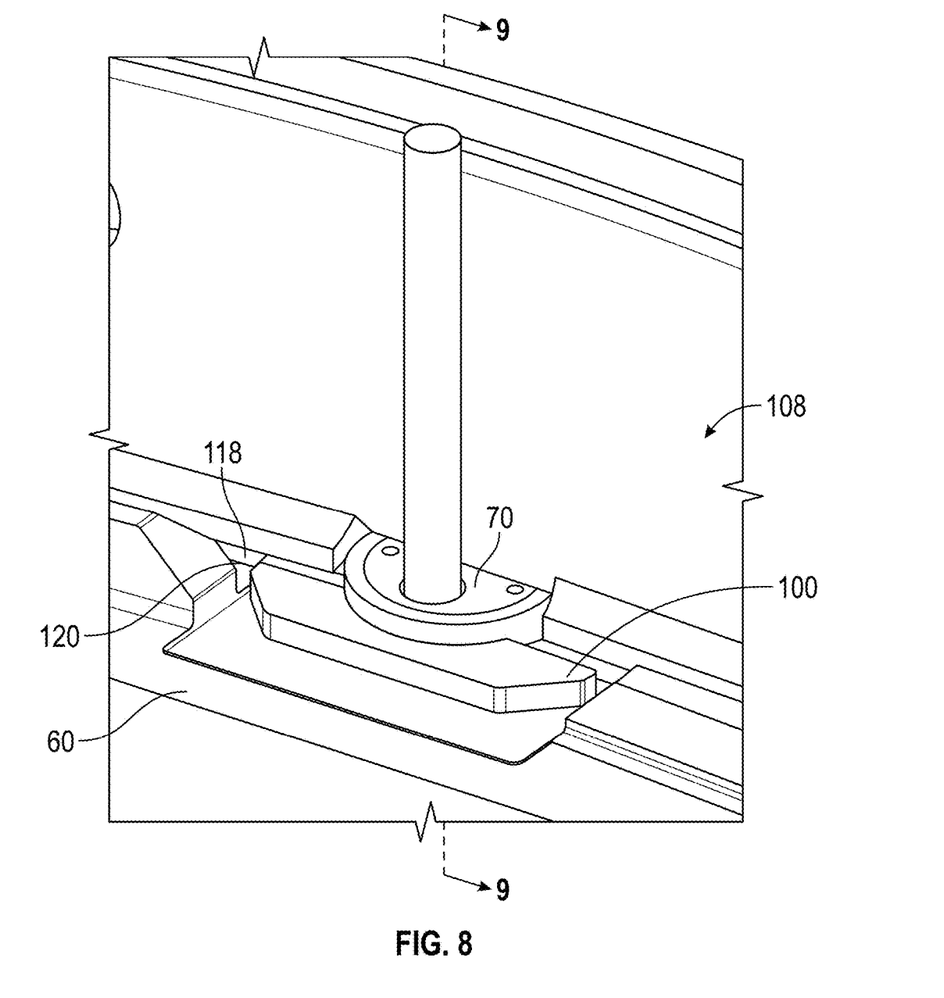
FIG. 8 is a perspective view of a heat shield assembled onto the probe and the case of FIG. 5, according to one embodiment of the present disclosure.
Figure 9:
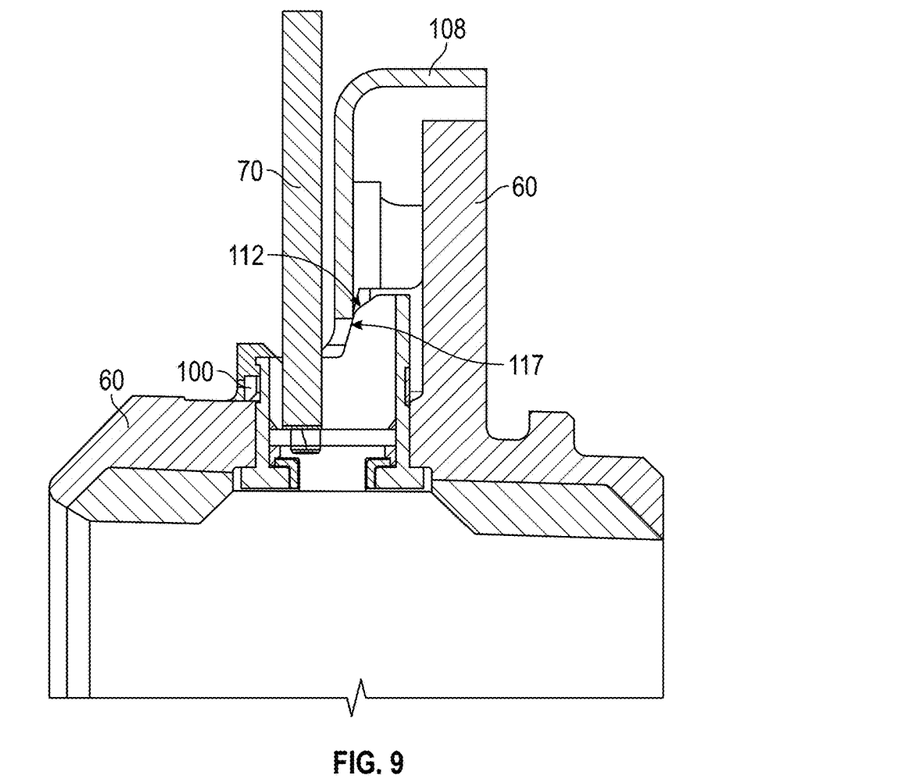
FIG. 9 is a cross-sectional view of the heat shield, probe, and case of FIG. 8 taken along line 9-9 of FIG. 8, according to one embodiment of the present disclosure.

In addition to serving as a retention feature for the probe 70 within the case 60, the fastener 100 may also serve as a sealing feature to fill gaps 106 between a heat shield 108 and the case 60 created by installation of the probe 70, as shown best in FIGS. 8 and 9. The fastener 100 may have a shape configured to provide a sealing arrangement with the heat shield 108. For example, surfaces of the fastener 100 may be designed to mate with the heat shield 108 and seal leak paths between the heat shield 108, case 60, and probe 70. More specifically, the fastener 100 may have vertical protrusions 110 which extend in a vertical direction (or radial direction with respect to the engine central longitudinal axis A in FIG. 1). The vertical protrusions 110 may provide support for backing the heat shield 108 and may have uninterrupted inclined surfaces 116 for the heat shield 108 to seal with in order to block gaps 106 and minimize leakage between the heat shield 108, case 60 and probe 70.

The shape and contoured surfaces 116 of the vertical protrusions 110 of fastener 100 may match a contour or inner surface 117 (FIG. 9) of the heat shield 108, similar to an inclined surface 112 of the probe 70 and an inclined surface 114 of the case 60, which are also designed to mate with the heat shield 108 in a sealing arrangement. By matching the surfaces 116 of the vertical protrusions 110 to the inner surface 117 of the heat shield 108 sealing contact between the fastener 110 and heat shield 108 may be made. Furthermore, surfaces 116 of the fastener 100 may be contoured to engage a snap fit with the heat shield 108. In so doing, the fastener 100 has a dual purpose of retention and sealing.

In addition to vertical protrusions 110 and inclined surfaces 116, the fastener 100 may have other shapes, contours, or features designed to block leakage paths and fill gaps. For example, fastener 100 may have laterally-extending tabs 118 specially contoured to seal grooves or crevices 120 between the case 60 and heat shield 108. Potting material, such as potting cement, epoxy, adhesives, or the like, may also be used to fill small 122 gaps between the fastener 100 and the case 60.

Figure 10:
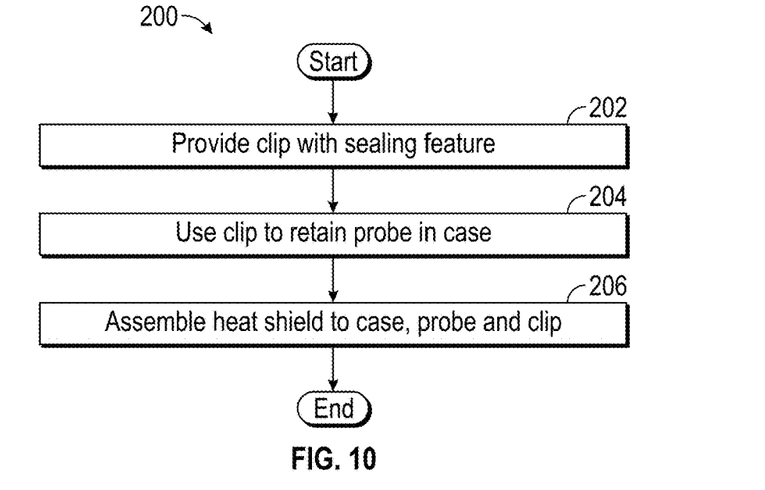
FIG. 10 is a flowchart outlining a method for installing a probe in a case of a gas turbine engine, according to another exemplary embodiment of the present disclosure.

Turning now to FIG. 10, with continued reference to FIGS. 1-9, a flowchart outlining a method 200 for installing the probe 70 into the case 60 of the gas turbine engine 20 is shown, according to another exemplary embodiment of the present disclosure. At a first block 202 of the method 200, the clip or fastener 100 of the probe 70 is provided with a sealing feature configured to engage with the heat shield 108 of the case 60 when assembled. Next, at a block 204, the fastener 100 is used to retain the probe 70 in the case 60. The case 60 is sandwiched between the fastener 100 and the lip 104 of the probe 70, forming a joint. The installation fixture 105 may impart a compressive load on the joint, and the fastener 100 may be welded to the probe 70. The installation fixture 105 may then be removed after welding of the fastener 100 to the probe 70.

At a final block 206, the heat shield 108 may be assembled to the case 60, probe 70, and fastener 100. The heat shield 108 may snap fit onto the case 60, probe 70, and fastener 100 in a sealing arrangement. In so doing, leak paths between those components may be sealed, thereby preventing heat transfer out of the case 60 and heat shield 108 and promoting the desired thermal expansion of the case 60. The fastener 100 serves the dual purpose of retention and sealing, thereby providing an efficient way to both retain the probe 70 in the case 60 and fill gaps 106 between the case 60 and heat shield 108. In an additional embodiment, potting material may be applied to the joint between the fastener 100, probe 70, and case 60.

It is to be understood that the shape and contour of fastener 100 is not limited to that shown in the figures. Other shapes, contours and designs for fastener 100 are certainly possible to retain the probe 70 within the case 60 and seal any gaps or leak paths between the case 60, probe 70, and heat shield 108. Furthermore, although the fastener 100 and probe 70 are shown and described for use within a case 60 of a gas turbine engine, it is to be understood that the fastener 100 and probe 70 may also be used in other types of engines or other non-engine related applications without departing from the spirit of the disclosure.

INDUSTRIAL APPLICABILITY

From the foregoing, it can be seen that the teachings of this disclosure can find industrial application, technical effects and benefits in any number of different situations, including but not limited to, gas turbine engines. Such engines may be used, for example, on aircraft for generating thrust, or in land, marine, or aircraft applications for generating power.

The described disclosure provides a reliable dual-purpose sealing and retention feature for probe installation within the case of the gas turbine engine. The disclosed fastener seals gaps between the heat shield and the case, while also retaining the probe to the case. By providing a sealing arrangement with the heat shield via inclined surfaces of vertical protrusions, the fastener blocks leak paths and minimizes leakage from the case, probe, and heat shield. In so doing, the fastener helps prevent heat transfer out of the case and heat shield, thereby promoting the desired thermal expansion of the case.

In addition, the fastener provides significant backing for any potting materials needed to seal small gaps. Thus, the fastener offers a hybrid solution for use of a retention feature to isolate the probe from case hoop stresses and egress through the heat shield. Furthermore, since the disclosed fastener is an integrated sealing and retention feature, it does not require additional or separate parts for sealing and retention, thereby reducing costs.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A fastener for a probe assembly of a gas turbine engine, comprising:
   a body configured to retain a probe within a case of the gas turbine engine and seal leak paths in the case, wherein the body has surfaces matching a surface of a heat shield to provide a snap fit arrangement with the heat shield.

2. A method for installing a probe in a case of a gas turbine engine, comprising:
   retaining the probe in the case with a clip, the clip including a sealing feature;
   assembling a heat shield to the case, the probe, and the clip; and
   engaging the heat shield with the sealing feature.

3. The method of claim 2, further comprising snap fitting the heat shield onto the case, probe, and clip in a sealing arrangement.

4. The method of claim 3, further comprising sandwiching the case between the clip and a lip of the probe to form a joint.

5. The method of claim 2, further comprising sandwiching the case between the clip and a lip of the probe to form a joint.

6. The method of claim 5, further comprising applying an installation fixture to impart a compressive load on the joint.

7. The method of claim 6, further comprising welding the clip to the probe, and removing the installation fixture.

* * * * *